Oct. 23, 1928.
J. A. HEANY
1,688,620
APPARATUS FOR THE MANUFACTURE OF YARN
Filed April 23, 1926    7 Sheets-Sheet 1
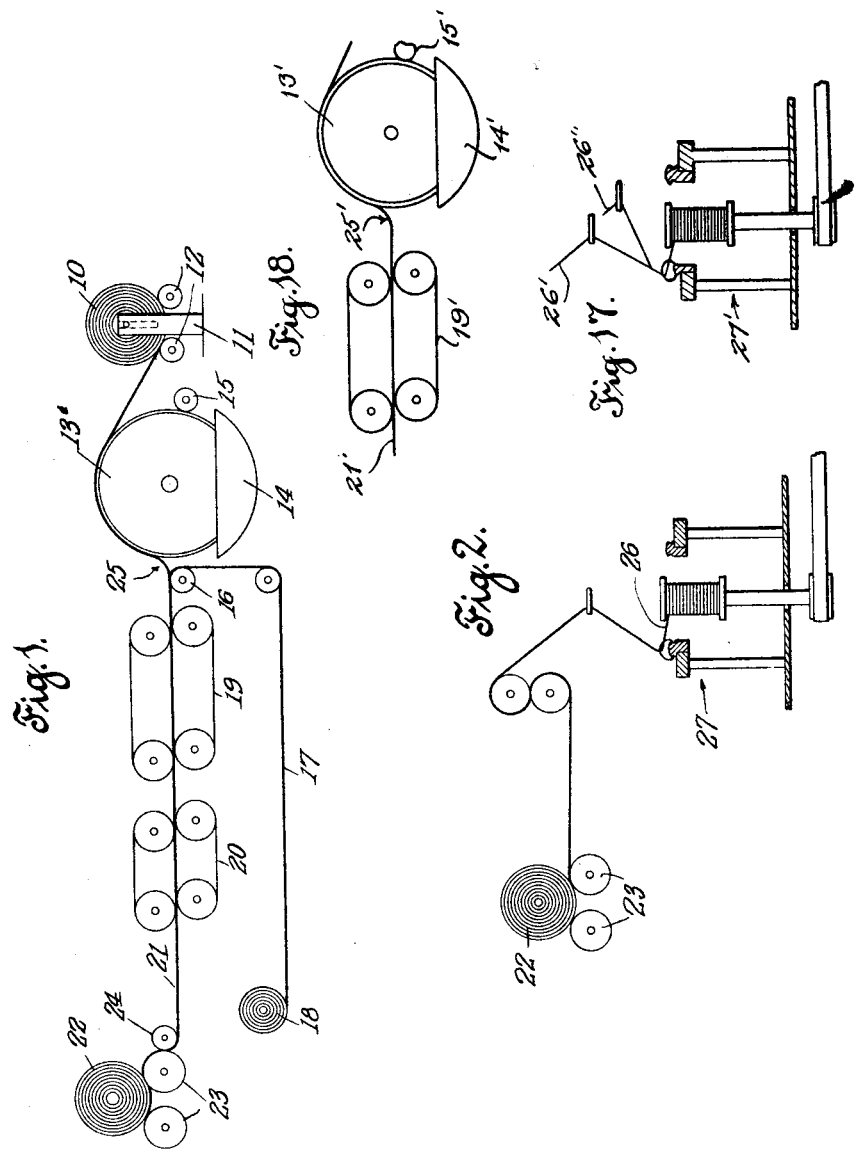
INVENTOR
John Allen Heany
BY
Chester W. Braselton
ATTORNEY Oct. 23, 1928.
J. A. HEANY
1,688,620
APPARATUS FOR THE MANUFACTURE OF YARN
Filed April 23, 1926   7 Sheets-Sheet 2
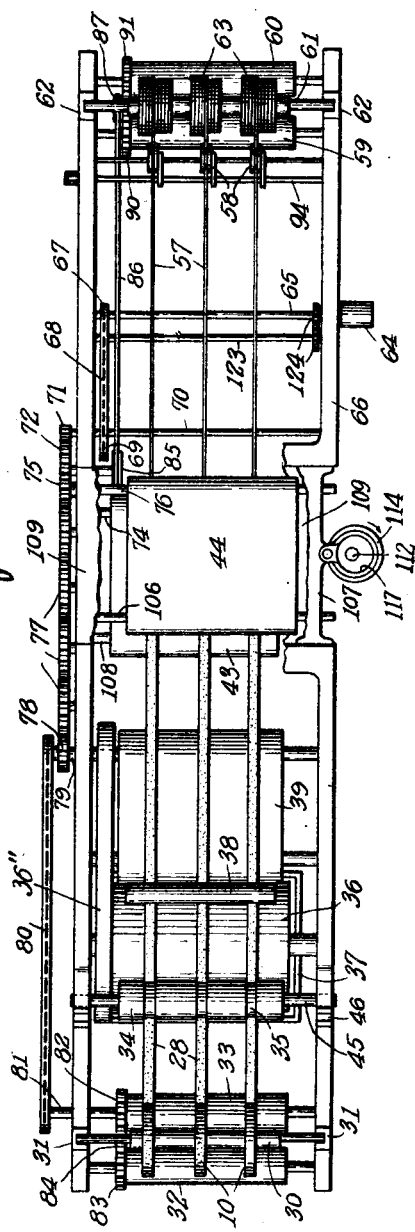
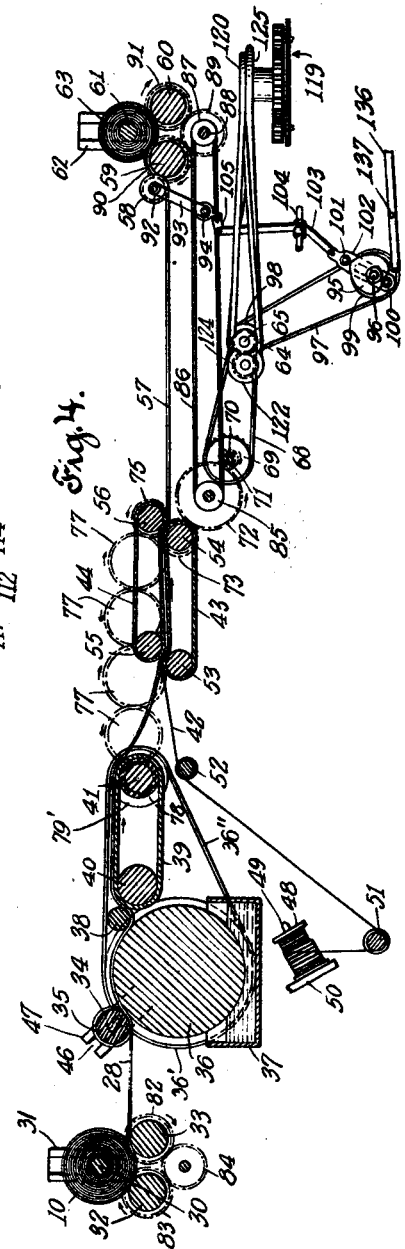
INVENTOR
John Allen Heany
BY
Chester V. Braselton
ATTORNEY Oct. 23, 1928.  1,688,620
J. A. HEANY
APPARATUS FOR THE MANUFACTURE OF YARN
Filed April 23, 1926   7 Sheets-Sheet 3
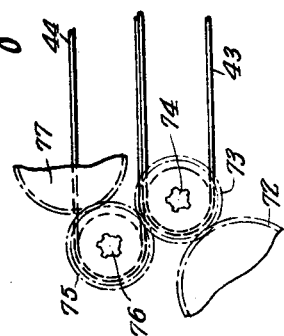
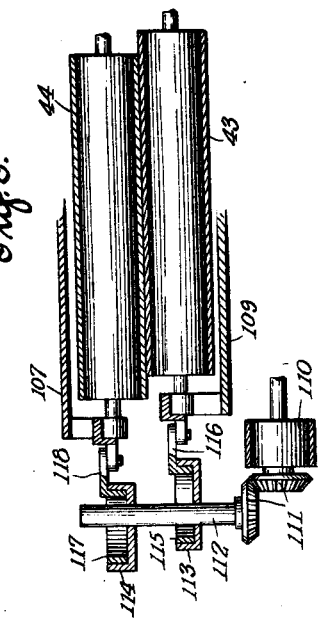
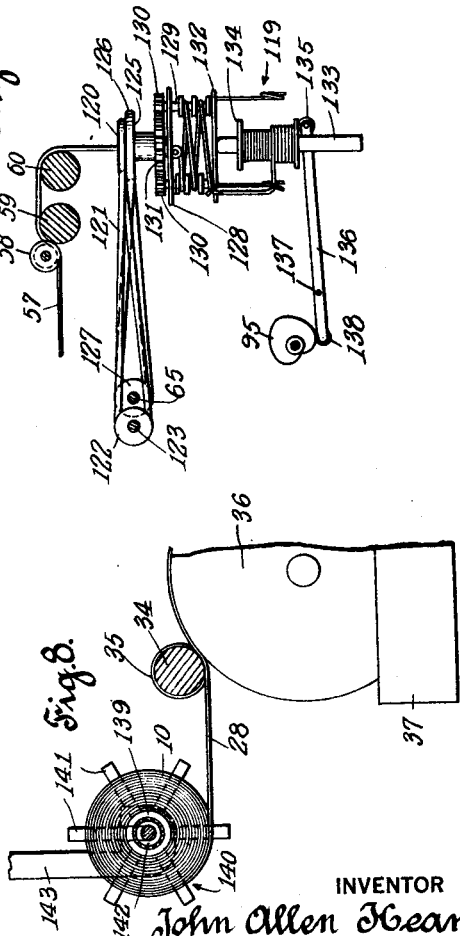
INVENTOR
John Allen Heany
BY
Chester H. Braselton
ATTORNEY Oct. 23, 1928.  
J. A. HEANY  
1,688,620  
APPARATUS FOR THE MANUFACTURE OF YARN  
Filed April 23, 1926  7 Sheets-Sheet 4
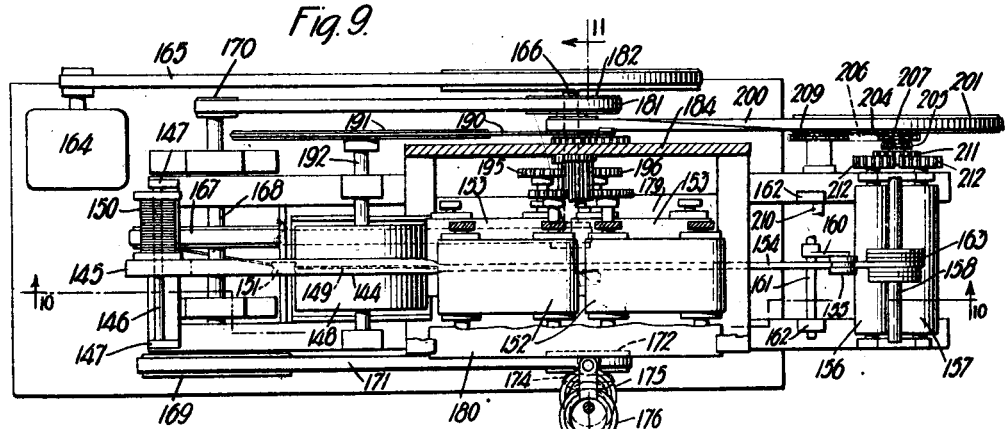
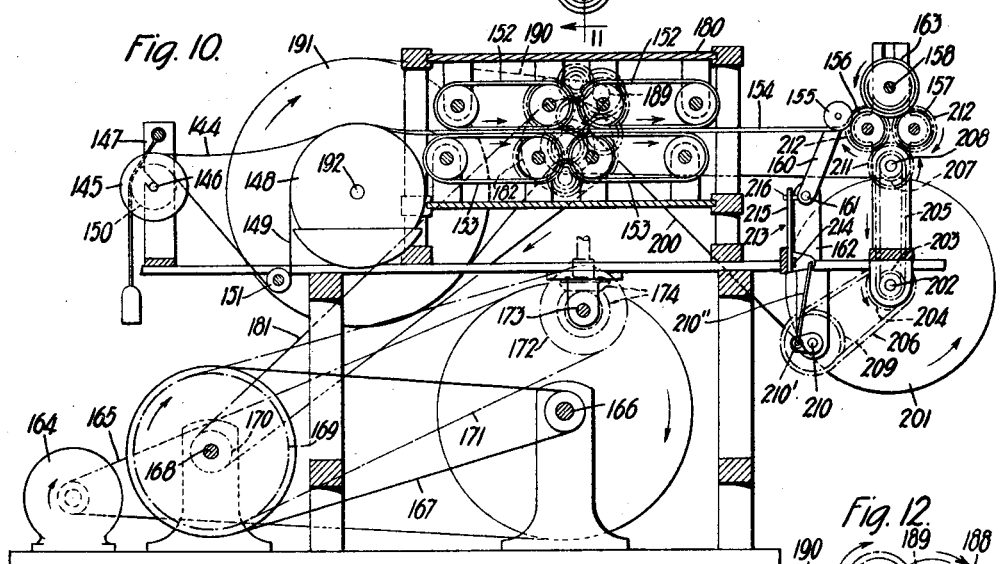
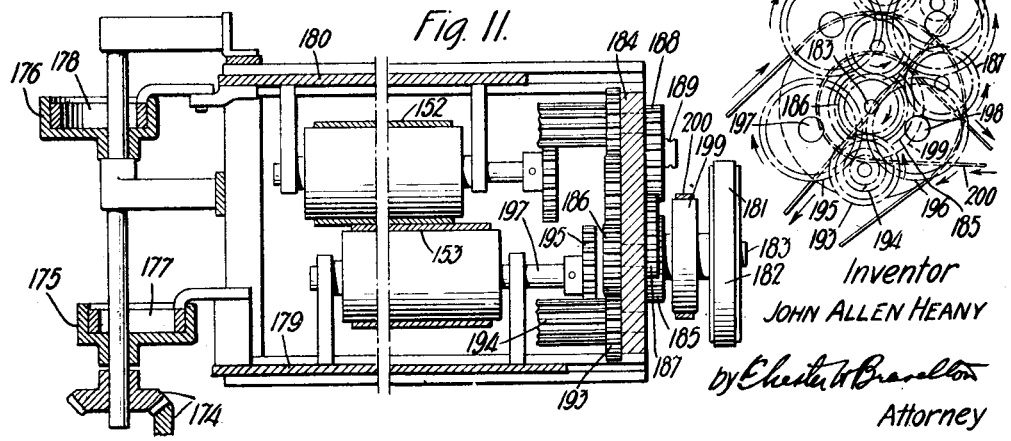
Inventor  
JOHN ALLEN HEANY  
by Chester W. Bradton  
Attorney

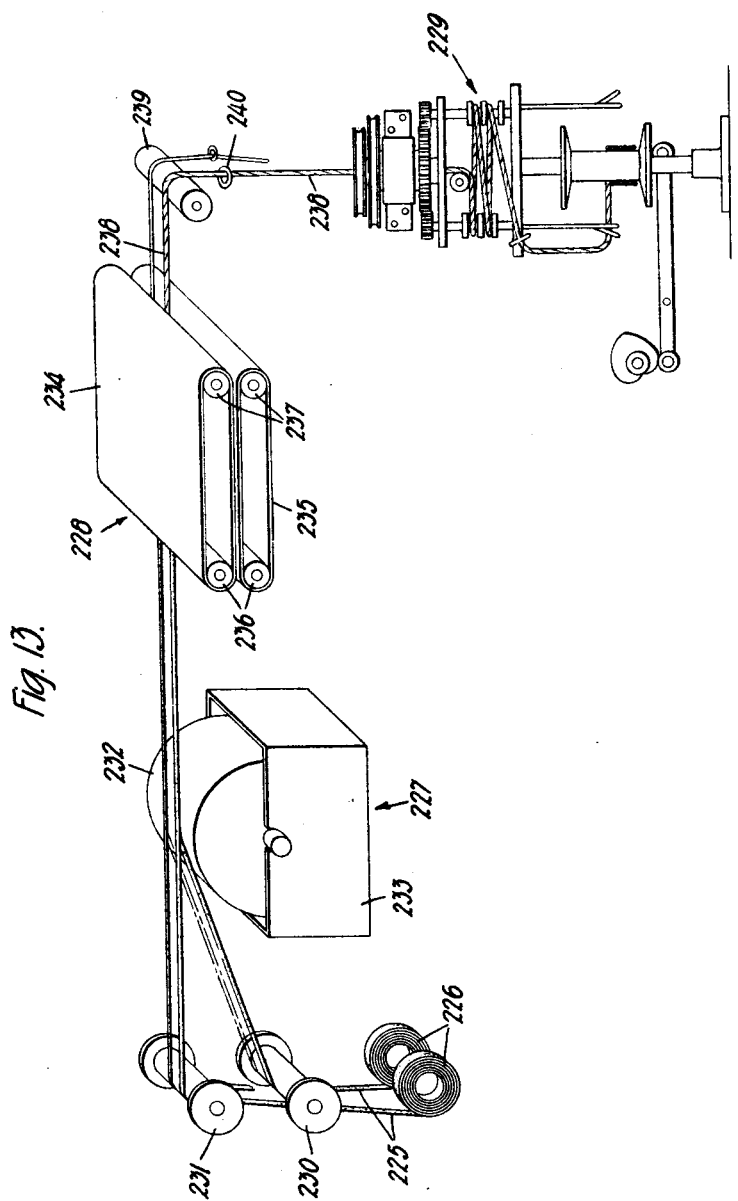

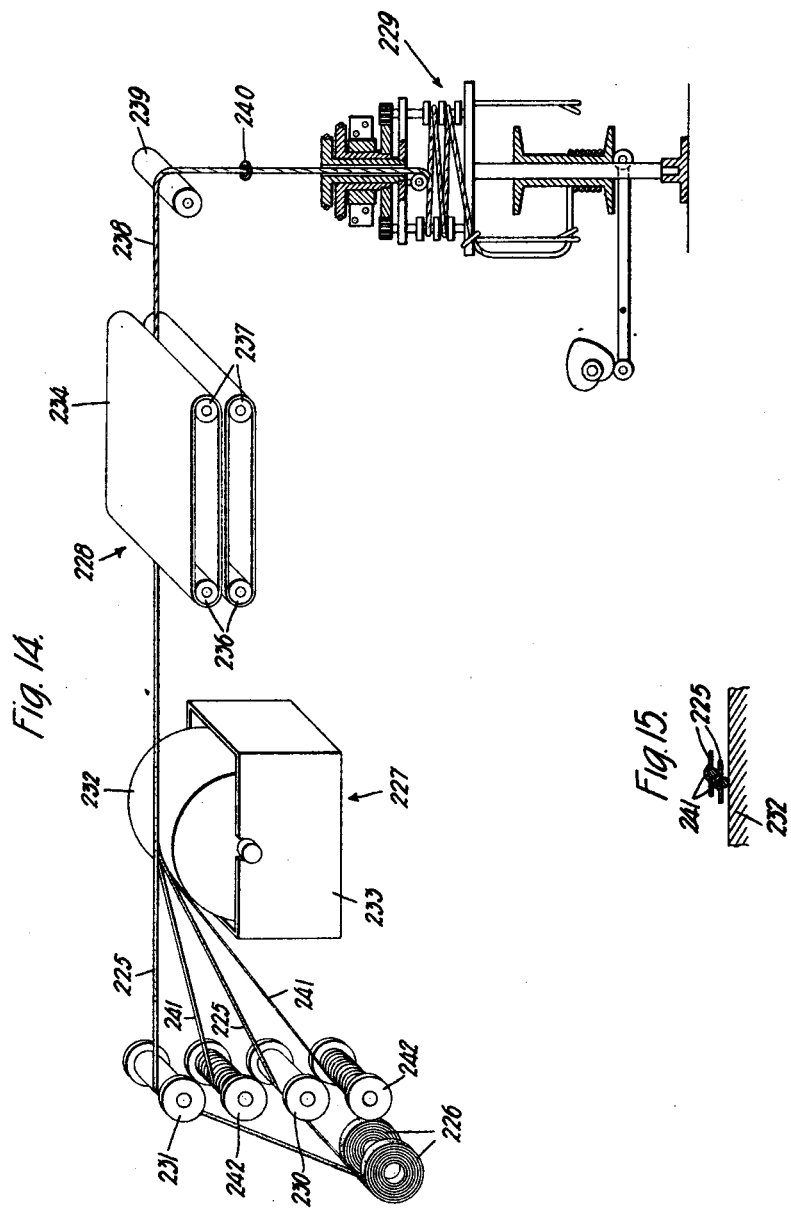

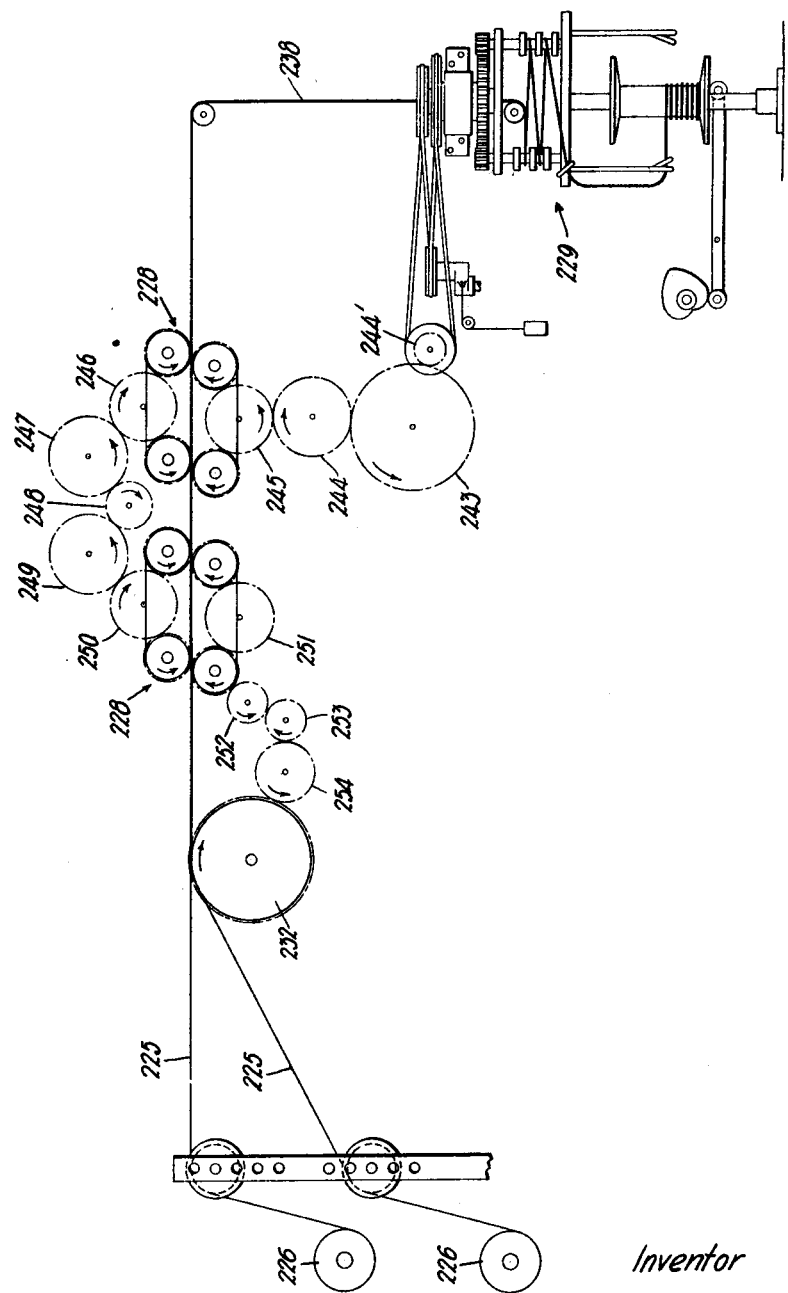

Patented Oct. 23, 1928.

1,688,620

UNITED STATES PATENT OFFICE.

JOHN ALLEN HEANY, OF NEW HAVEN, CONNECTICUT, ASSIGNOR TO WORLD BESTOS CORPORATION, OF PATERSON, NEW JERSEY, A CORPORATION OF DELAWARE.

APPARATUS FOR THE MANUFACTURE OF YARN.

Application filed April 23, 1926. Serial No. 104,056.

The present invention relates to apparatus for manufacturing yarn and more particularly to apparatus for the manufacture of yarn from material which gives rise to numerous difficulties in attempted manufacture by old processes and apparatus.

This application is a continuation in part of my Patents No. 1,585,611 (application Serial No. 82,249, filed January 19, 1926); No. 1,585,612 (application Serial No. 82,250, filed January 19, 1926); No. 1,585,621 (application Serial No. 654,511, filed July 30, 1923); No. 1,585,617 (application Serial No. 684,324, filed January 4, 1924); No. 1,585,618 (application Serial No. 685,091, filed January 9, 1924); and No. 1,585,619 (application Serial No. 685,092, filed January 9, 1924).

An important object of the invention is to provide apparatus capable of making yarn from relatively weak strips or bands of fibrous material, such, for example, as asbestos material or material consisting largely of asbestos.

Other objects of the invention are to provide apparatus for making strands or yarns from asbestos paper-like material; apparatus for conveying a strip or band of fibrous material substantially free from tension to a certain point and thereafter forming a rounded strand therefrom; apparatus for supporting and conveying a strip or band of fibrous material to a certain point, forming a strand from said strip or band and twisting the strand to form a yarn; apparatus for softening a strip or band of fibrous material, supporting and conveying the same to a certain point, and forming said strip or band into a strand or yarn; and apparatus for conveying a strip or band substantially free from tension to a certain point and thereafter combining said strip or band with a filament to form a strand or a yarn.

The apparatus of the present invention is designed more particularly for the manufacture of asbestos strands or yarns from paper-like strips or bands of asbestos material bound together with sufficient cohesiveness and tenacity and adapted for yarn manufacture. Preferably such strips or bands are softened, as by moistening before the formation of yarn. Such strips or bands are very easily torn or broken, especially when softened or moistened. The apparatus of the present invention aims to avoid such difficulties, as by providing means for supplying such strips or bands freely, for conveying them substantially free from tension to the strand forming mechanism proper and for supporting them during strand and yarn forming operations. Preferably moistening, if it occurs, is effected concomitantly with such conveying of the strips and each moistened strip is combined with a filament in the strand forming mechanism to form a strand in which the strip or band of asbestos material is reinforced or strengthened by the filament which may be of wire or thread. Obviously each strand or yarn may be formed from one or more strips or bands and one or more filaments.

Other objects and features of the invention will be brought out hereinafter in the description and claims.

In the drawings:

Fig. 1 is a diagrammatic side elevation illustrating one form of apparatus for forming yarn material into strands;

Fig. 2 is a view in elevation of apparatus which may be used for twisting such strands to form yarn;

Fig. 3 is a horizontal plan view of a specific form of apparatus for carrying out the same general operations as the apparatus indicated in Fig. 1;

Fig. 4 is a diagrammatic side elevation of the mechanism of which a plan is shown in Fig. 3;

Fig. 5 is a detail view of the mechanism for transversely reciprocating the rubbing belts;

Fig. 6 is a detail of the operating means for the driving belts;

Fig. 7 is a view illustrating the use of a twister to which the strand is fed directly from the strand forming apparatus;

Fig. 8 is a view illustrating a modified form of device for supplying a strip or band to the moistening and conveying means;

Fig. 9 is a diagrammatic plan view, partly in section, of another form of apparatus for carrying out the invention;

Fig. 10 is a diagrammatic side elevation, partly in section;

Fig. 11 is a detail sectional view;

Fig. 12 is a diagrammatic view on a larger scale of parts shown on Fig. 10; and

Figs. 13, 14, 15, 16, 17 and 18 illustrate modified forms of the invention.

Although the apparatus of the present invention is adapted for more general use, it is designed more particularly for operating upon strips or bands of asbestos material to form asbestos strips or yarns. As disclosed in said Patent No. 1,585,611, (application, Serial No. 82,249), the asbestos material may be formed into pulp and bound and formed together with suitable binding material, which preferably includes a workable binder such as starch, into strips or bands of the required width. These strips or bands may for convenience be formed into flat rolls.

Referring to Fig. 1, the numeral 10 designates a roll of paper-like strip or band formed as above described; 11 designates a support in which one end of a core carrying one or more such rolls 10 may be guided for vertical movement, and 12 designates positively driven rolls on which the roll or rolls 10 rest and by which unwinding at a uniform rate is obtained. The moistening or softening of each strip or band to make it more workable is effected by passing it over a positively driven roll 13, which is preferably covered with felt. This felt covered roll dips into water or other softening or moistening material contained in a receptacle 14, the amount of water carried up by the felt covering being regulated by a roll 15 which presses against the felt. The softened strip or band passes from roll 13 substantially free from tension to a roll 16 over which it passes in superposed relation with a positively driven reinforcing filament or element 17 of wire or thread drawn from a reel or spool 18. The filament and strip or band then pass between two pairs of rub motion belts 19 and 20, which are driven longitudinally at the same rate and are laterally reciprocated with respect to each other, as well understood in the art. The softened strip or band is thereby rubbed around the reinforcing filament and formed into a reinforced strand or preliminary yarn 21 of uniform thickness and capable of general use. The strand 21 may then be wound into a cheese or cop 22, as indicated in the drawing, the cheese 22 being actuated by positively driven rolls 23 and the strand 21 being guided to the cheese in any suitable manner.

I prefer, however, to employ a guide roller 24 having a shallow peripheral groove therein (not shown) to receive the strand 21. This roller preferably contacts with one of the driven rollers 23 and is axially movable by traverse mechanism (not shown) so as to effect a uniform winding of the finished strand or preliminary yarn 21 along the longitudinal length of the cheese or package 22, as will be here understood. It is obvious that the positively driven rolls 12, 13 and 23 and rub motion belts 19 and 20 are driven substantially in synchronism to effect a uniform feed. Preferably, however, provisions are made for imparting a longitudinal movement of the strip to the rub motion belts slightly greater than that imparted thereto after the same reaches the belts. This is clearly illustrated at 25. From the foregoing it will be apparent that the asbestos material is conveyed from the roll 10 or other source to the rub motion belts 19 substantially free from any tension which would tend to break or even rupture the strip between the two points mentioned.

The final step of the process consists in twisting the strand 21, produced as above described, to form the finished yarn 26. For this purpose the cheese 22 is placed on an ordinary ring twister, indicated generally by the numeral 27, Fig. 2. Instead of twisting a single strand to form a single yarn, two or more strands may be twisted together as indicated in Fig. 17, forming multiple yarn of greater strength and durability; or, of course, two or more twisted strands may be twisted together with a similar result. While I prefer to form the strands by rubbing the moistened or softened paper-like material around the reinforcing filament the strands may be formed unreinforced by omitting the reinforcing filament, as indicated in Fig. 18, and subsequently twisted with a filament in a manner indicated in Fig. 17.

I have illustrated diagrammatically in Fig. 1 a form of apparatus embodying the present invention. Only one strand 21 is illustrated as being formed but it will be obvious to those skilled in the art, that any number of strands, within reasonable limits, may be formed simultaneously.

In Figs. 3 and 4, disclosure is made not only of a general arrangement of parts similar to that of Fig. 1, but of operating means therefor. As shown in these figures, a plurality of rolls 10 of paper-like strips or bands 28 are placed on a mandrel 30 and then this mandrel is placed in grooved guides 31 which permit vertical movement of the mandrel, and the rolls 10 are lowered into contact with positively driven rolls 32 and 33 which serve to feed off the strips or bands 28 at a uniform rate to permit them to pass beneath a guide roll 34 and along grooves 35 thereof to a positively driven moistening roll 36 which extends into water or other suitable fluid in a tank 37 and carries up some of the liquid to moisten and soften the strips or bands. From the moistening roll 36 each strip or band 28 passes beneath a roll 38 to a belt 39 carried by rolls 40 and 41 and serving to convey such strip or band and to lay it on a filament 42 which together with the strip or band is delivered to upper and lower rub motion belts 43 and 44, respectively, which serve to shape, form or mold the strip or band about the filament 42. As clearly shown in Figs. 3 and 4, the roll 38 rests in the angle between the moistening roll 36 and the belt 39, and the roll 34 is held in position by journals 45 projecting from the ends thereof and resting in inclined slots 46 in members 47.

Each filament 42, which may be a wire or thread, is drawn from a spool 48 mounted on a pin 49 projecting upwardly from an inclined upper surface of a support 50 and in a direction downwardly inclined with respect to said inclined upper surface, to obtain the proper tensioning effect. The filament 42, is then carried beneath a guide 51 and over a second guide 52 to deliver it in the proper direction to the rub motion belts 43 and 44 of which the lower 43 is supported on rolls 53 and 54 and the upper is supported on rolls 55 and 56. From these belts 43 and 44 each strand 57 formed from a filament 42 and a strip or band 28 is guided by a grooved roll 58 to a positively driven roll 59 which together with a second positively driven roll 60 winds up the strands 57 on suitable means such as split pasteboard tubes (not shown) mounted on a mandrel 61 which is guided for vertical movement in members 62. During such winding the strands 57 are moved back and forth by means to be described hereinafter and formed into cheeses 63.

Power for driving the mechanism is supplied to a pulley 64 on a shaft 65 journaled in the frame 66 and carrying a sprocket 67 connected by a chain 68 with a sprocket 69 on a shaft 70 from which power is transmitted by a gear 71 and a gear 72 to a gear 73 slidably mounted on a shaft 74 which supports and drives the roll 54 carrying one end of the lower belt 43. From the gear 73 power is transmitted to a gear 75 which is slidably mounted on a shaft 76 supporting and driving roll 56 at one end of the upper belt 44 and through a train of gears 77 to a gear 78 on a shaft 79 supporting and driving the roll 41 which carries one end of the belt 39. From the shaft 79, power is transmitted by a sprocket chain 80 and sprockets (not shown) to a shaft 81 supporting and driving the roll 33. Rolls 32 and 33 are provided respectively, with gears 82 and 83 of equal size, which are connected by a gear 84. To drive the moistened roller 36 provision may be made of a pulley 36' secured thereto and connected by means of a belt 36" with a pulley 79' on shaft 79.

Connected with the gear 72 is a pulley 85 from which power is transmitted by a belt 86 to a pulley 87 on a shaft 88 which carries a gear 89 meshing with gears 90 and 91 fixed to rolls 59 and 60 respectively. The rolls 58 which serve to traverse the strands 57 to build up the cheeses or packages 63, are revolubly mounted on a shaft 92 carried on arms 93 fixed on a transverse shaft 94 slidable longitudinally on the frame 66. Such longitudinal movement of the shaft 94 may be effected by means of a heart cam 95 on a shaft 96 driven from the shaft 65 by suitable connections including a belt 97 and pulleys 98 and 99 on shafts 65 and 96, respectively. The heart cam 95 engages rolls 100 and 101 on a yoke 102 slotted to receive shaft 96 and connected with a bent lever 103 fulcrumed at 104 and acting through a link 105 to reciprocate the shaft 94.

The shafts 76 and 106 of the upper belt 44 are supported for longitudinal movement by means including a slide 107 fitting at its edges into grooves (not shown) in the frame of the machine. In the same way the shafts 74 and 108 of the lower belt 43 are supported by means including a slide 109 mounted in frame 66. This arrangement is made to enable transverse reciprocation of the belts 43 and 44 which is effected by supplying power from a suitable source to a pulley 110 from which power is transmitted through bevel gears 111 to a vertical shaft 112 carrying lower and upper eccentric cups 113 and 114, respectively, the lower cup 113 having fitted therein a ring 115 on one end of a link 116 pivoted at its other end to the slide 109 and the upper cup 114 having fitted therein a ring 117 on one end of a link 118 pivoted at its other end to slide 107. During the transverse reciprocation of the belts 43 and 44, shafts 74 and 76 must slide in the gears 73 and 75 without breaking the driving connection. To obtain this effect, one end of each of the shafts 74 and 76 is formed as shown in Fig. 6 and has a sliding fit in the corresponding one of the gears 73 and 75.

As indicated in Fig. 7, each strand 57, instead of being formed into a cheese 63, may be fed from the rolls 59 and 60 to a twister indicated in general by 119 and having an upper pulley 120 driven by a belt or band 121 extending around a pulley 122 on a shaft 123 driven from shaft 65 by intermeshing gears 124, and a lower pulley 125 driven by means of a belt or band 126 from a pulley 127 on shaft 65. The upper pulley 120, which effects the twisting, is connected with a cross member 128 which carries shafts 129 having at their upper ends gears 130, meshing with a gear 131 driven by pulley 125, said shafts 129 being supported at their lower ends by a cross member 132 resting on a spindle 133 for a spool 134 which is moved up and down by a roll 135 on a lever 136. Said lever 136 is pivoted at 137 and carries a roll 138 which contacts with the heart cam 95. A similar twister is more fully described in my Patent No. 1,585,615 (application, Serial No. 687,218, filed January 19, 1924.)

When the twister 119 is used, reciprocation of the grooved guide rolls 58 would have no useful function and the shaft 94 may be disconnected from the heart cam 95. Also, when the twister 119 is not in use, the lever 136 may be removed.

In Fig. 8, there is illustrated another arrangement for supplying a strip or band 28 to the moistening roll 36, in which a roll 10 of the strip material is placed on the barrel or drum 139 of a reel 140 having radial arms 141 which serve to hold the roll 10 in shape. The drum 139 is mounted by ball bearings on a hub 142 which fits into a hook-shaped hanger 143, the hub 142 having a suitable groove to receive the inner edge of the hanger 143. Obviously the tension required to draw the strip or band 28 from the reel 140 is very slight.

It should be understood that as in the apparatus shown in Fig. 1, provisions are made for imparting to the strips on their way to the rub motion belts, a longitudinal movement slightly greater than that imparted thereto after the same reaches the belts.

Another form of apparatus for carrying out the invention is illustrated in Figs. 9, 10, 11 and 12. A strip 144 of asbestos paper-like material is drawn under low tension from a roll 145 mounted on a rod 146 removably mounted in uprights 147 and is fed over a positively driven moistening roll 148 above a filament or wire 149 drawn from a suitably tensioned spool 150 and guided to moistening roll 148 beneath a grooved roll 151. The strip 144 and the wire 149 are then passed between upper and lower rub motion belts of two sets 152 and 153 respectively and formed into a strand 154 in which the paper-like material is condensed about the wire. The strand 154 passes beneath a grooved roll or wheel 155 resting on a roll 156 which together with a roll 157 winds up the strand 154 on a suitable core or the like mounted on a rod 158 guided at its ends in grooved uprights. The grooved roll 155 is revolubly mounted on the upper end of an arm 160 carried by a rod 161 slidable longitudinally in brackets 162, and the rod 161 is reciprocated by means to be described hereinafter to guide the strand 154 in building a suitable yarn package or cheese 163.

Motion is transmitted from a motor 164 through means including a belt 165 to a shaft 166 and from shaft 166 by means including a belt 167 to a shaft 168 carrying two pulleys 169 and 170. From pulley 169 motion is transmitted through a belt 171, a pulley 172, a shaft 173 and bevel gears 174 to a vertical shaft carrying eccentric cups 175 and 176 in which fit rings 177 and 178 connected respectively to slides 179 and 180. Slide 179 carries the lower rub motion belts and slide 180 carries the upper rub motion belts.

From the pulley 170 power is transmitted by means of a belt 181 to a pulley 182 on a shaft 183 journalled in a plate 184 and carrying at the outside of said plate a gear 185 and at the inside of the plate a gear 186. From gear 185 power is transmitted through gear 187, gear 188, pulley 189 and belt or band 190 to a pulley 191 on a shaft 192 carrying the moistening roll 148.

From the gear 186 power is transmitted downwardly to a gear 193 and an elongated gear 194 having a sliding engagement with pinions 195 and 196 mounted on shafts 197 and 198 carrying rolls supporting adjacent ends of the two lower rub motion belts. Power is also transmitted from gear 186 through a similar gear arrangement to drive the upper rub motion belts.

Shaft 183 also carries a pulley 199 from which power is transmitted by a crossed belt 200 to a pulley 201 mounted on a shaft 202 carrying sprockets 203 and 204 which act respectively through chains 205 and 206 to drive sprocket 207 and shaft 208, and sprocket 209 and shaft 210. Shaft 208 carries a gear 211 meshing with gears 212 driving rolls 156 and 157 respectively. Shaft 210 carries an eccentric pin 210' which is connected by a rod 210'' to a generally horizontal arm of a bell crank 213 and serves to rock the latter about its pivot 214 and through an upwardly extending arm 215 of the bell crank and a pin and slot connection 216 reciprocate the rod 161.

It will be readily apparent that one or a plurality of strips or bands of asbestos material may be combined, by the apparatus shown and described in Figs. 1 to 12, with one or a plurality of filaments to form a strand or a yarn. It is also apparent that where a plurality of strips or bands and one or more filaments are employed to form a yarn, and where a single strip or band and a plurality of filaments are employed to form a yarn said strip or band or said strips or bands and said filament or filaments may be arranged alternately with one another. This is all clearly set forth in the description below of Figs. 13 to 16 both inclusive.

In Fig. 13 is more or less diagrammatically illustrated a form of apparatus which may be employed in the manufacture of coreless or unreinforced yarn. Referring thereto in detail the asbestos paper is applied to the mechanism in the form of a strip or tape 225 and is wound into rolls 226 and mounted on spools, (not shown). The major elements of the mechanism include the moistener 227, a condenser 228 and a twister 229, these elements being placed adjacent to each other in position to permit of a continuous feed of the material being worked upon from one member to the other. As illustrated, the tape is unreeled from spools over guide rollers 230 and 231, one of which is mounted below the other so as to facilitate feeding to the moistener roll 232. The tape is fed flat over the moistener roll 232 which in turn is rotatably mounted in the walls of the tank 233. The tank is adapted to contain water or any other moistening liquid and the roller 232 has a portion of its body extending above the level of the liquid so that as it rotates, liquid carried upon its surface enters the paper strip and moistens the same.

After leaving the moistening roll 232, the paper strip is fed into the condenser 228 which comprises two facing belt structures 234 and 235 mounted on parallel rollers 236 and 237. The adjacent faces of these belts are adapted to be moved as by the mechanism shown in Figs. 3 to 12, in a forward direction and at the same time reciprocate laterally and simultaneously in opposite directions, thus seizing upon the paper strip as it progresses through the condenser and manipulating it in such fashion by rubbing and rolling that it emerges at the forward end of the condenser as a smoothly rounded strand 238. The strand, while still moist, is led over the guide roll 239 through a guide loop 240 and either alone or simultaneously with one or more other similar strands into the twister 229 where the strands are subjected to the final step of the process.

From the foregoing, taken in connection with the accompanying drawing, it will be seen that the strand 238 is unreinforced and is composed of one or of a plurality of paper-like strips of asbestos material. The mechanism of Fig. 13 so far described is fully illustrated and described in my copending application Serial No. 684,324, filed January 4, 1924 to which reference is hereby made.

One or more filaments may, if desired, be combined with each strand 238 said filaments being wound upon suitably supported spools. This combining of one or more filaments with a coreless or unreinforced strand is fully illustrated and described in my Patent No. 1,585,618.

In Fig. 14 I have illustrated mechanism for uniting one or more filaments and one or more paper-like strips of asbestos material prior to their passing over the moistening roll 232 by which a yarn is formed composed of one or more filaments and one or more strips of asbestos paper-like material. As the mechanism is quite similar to the mechanism shown in Fig. 13 a detailed description thereof is deemed to be unnecessary particularly as the various parts are designated by corresponding numerals. Fig. 15 illustrates the relative position of the filaments and strips as they pass over the moistening roll 232.

The mechanism of Fig. 14 just described and how it operates upon the filaments and tapes to produce yarn is fully described in my Patent No. 1,585,619.

It will of course be understood that the parts of the mechanism shown in Figs. 13 and 14 are operated in synchronism by the mechanism illustrated in Figs. 3 to 12 inclusive but diagrammatically illustrated in Fig. 16, it being understood that two condensers 228 are illustrated in this figure. At 243 is illustrated a gear which may be operated from any suitable source. This gear is connected to a pinion 244' to operate the twister and is also connected to a train of gears 244 to 254 to operate the condensers and the moistening roll 232, gears suitably constructed and arranged on the condenser rollers being provided and meshing with the part of the train above referred to to operate the said condensers. It will be understood that suitable mechanism is provided, such as illustrated in Figs. 3 to 12 to impart a laterally reciprocating motion in opposite directions to the rub motion belts.

From the foregoing description taken in connection with the accompanying drawings, it will be seen that I have devised novel apparatus for the manufacture of yarn. It should be understood, however, that the apparatus herein illustrated and described is merely illustrative of the invention and that I do not limit myself to such forms in carrying out the invention. It is also to be expressly understood that various modifications of the apparatus may be resorted to without departing from the true spirit and scope of my invention.

I make no claims herein to the process of making yarn by the apparatus herein illustrated and described as that constitutes in part the subject of my Patents Nos. 1,585,611; 1,585,621; 1,585,617; 1,585,618; and 1,585,619 above referred to. Nor do I claim herein the yarn made by the apparatus herein shown and described as that constitutes the subject matter of my Patent No. 1,585,612, and the other part of the subject matter of my Patents Nos. 1,585,621; 1,585,617; 1,585,618 and 1,585,619 above referred to.

Having thus described my invention, what I claim is:

1. In apparatus adapted for the manufacture of yarn from paper-like strips or bands of asbestos material bound with sufficient cohesiveness and tenacity and adapted for yarn manufacture, the combination with strand forming means, of means for conveying thereto a strip or band substantially free from tension.

2. In apparatus adapted for the manufacture of yarn from paper-like strips or bands of asbestos material bound with sufficient cohesiveness and tenacity and adapted for yarn manufacture, the combination with strand forming means, of means for directing a filament thereto; and means for conveying to said strand forming mechanism into juxtaposition with said filament, one or more of such strips or bands substantially free from tension.

3. In apparatus adapted for the manufacture of yarn from paper-like strips or bands of asbestos material bound with sufficient cohesiveness and tenacity and adapted for yarn manufacture, means for supporting a roll of such strip or band and positively feeding such strip or band therefrom; means for supporting and conveying such strip or band to the desired position, and strand forming means receiving such strip or band from such supporting and conveying means and operating thereon to form a strand.

4. In apparatus adapted for the manufacture of yarn from paper-like strips or bands of asbestos material bound with sufficient cohesiveness and tenacity and adapted for yarn manufacture, means for supporting a roll of such strip or band and positively feeding such strip or band therefrom; means including a moistening roll for supporting and conveying such strip or band to the desired point; and strand forming means receiving such strip or band from the supporting and conveying means.

5. In apparatus adapted for the manufacture of yarn from paper-like strips or bands of asbestos material bound with sufficient cohesiveness and tenacity and adapted for yarn manufacture, means for supplying freely such a strip or band; strand forming means, and intermediate means for supporting and conveying said strip or band from the supplying means to said strand forming means and including a moistening roll receiving said strip or band from the supplying means; and means including a belt for receiving said strip or band from said moistening roll and delivering the same to said strand forming means.

6. In apparatus adapted for the manufacture of yarn from paper-like strips or bands of asbestos material bound with sufficient cohesiveness and tenacity and adapted for yarn manufacture, means for supplying such a strip or band, moistening and conveying means including a positively driven moistening roll receiving said strip or band and conveying it away from such supplying means; means including an auxiliary roll engaging said moistening roller at the side toward said supplying means, for determining the point at which said strip or band is brought into engagement with said moistening roll; and strand forming means receiving said strip or band from said moistening and conveying means and forming the same into a strand or yarn.

7. In apparatus adapted for the manufacture of yarn from paper-like strips or bands of asbestos material bound with sufficient cohesiveness and tenacity and adapted for yarn manufacture, means for supplying such a strip or band; moistening and conveying means including a positively driven moistening roll receiving said strip or band and conveying it away from such supplying means; means, including an auxiliary roll having a groove along which said strip or band runs and engaging said moistening roll, for determining the point at which the strip or band engages the moistening roll; and strand forming means receiving said strip or band from said moistening and conveying means and forming the same into strand or yarn.

8. In apparatus adapted for the manufacture of yarn, from asbestos paper-like material bound together with sufficient cohesiveness and tenacity and adapted for yarn manufacture, comprising means for forming such paper-like material into a strand and advancing the same; means for supporting and conveying said paper-like material to such strand forming means; and actuating means for said strand forming means and such supporting and conveying means effecting a somewhat faster movement of the paper-like material by the supporting and conveying means than in the strand forming mechanism.

9. In apparatus adapted for the manufacture of yarn from paper-like strips or bands of asbestos material bound with sufficient cohesiveness and tenacity and adapted for yarn manufacture, means for supporting a roll of such a strip or band and positively feeding the strip or band therefrom; means for supporting and conveying the strip or band to the desired point, strand forming means receiving the strip or band from such supporting and conveying means; and means for directing a filament into juxtaposition with said strip or band at said strand forming means for association into a strand.

10. In apparatus adapted for the manufacture of yarn from paper-like strips or bands of asbestos material bound with sufficient cohesiveness and tenacity and adapted for yarn manufacture, means for supporting a roll of such a strip or band and positively feeding the strip or band therefrom; means including a moistening roll for supporting and conveying the strip or band to the desired point; strand forming means receiving the moistened strip or band from such supporting and conveying means; and means for directing a filament to the strand forming means to be combined with the strip or band into a strand and to support the strip or band in entering and passing through the strand forming mechanism.

11. In apparatus adapted for the manufacture of yarn from paper-like strips or bands of asbestos material bound with sufficient cohesiveness and tenacity and adapted for yarn manufacture, means for moistening a strip or band and conveying it substantially free from tension; strand forming means receiving the moistened strip or band and rubbing the same transversely to form a strand; and means for twisting the strand thus formed into a yarn.

12. In apparatus adapted for the manufacture of yarn from paper-like strips or bands of asbestos material bound with sufficient cohesiveness and tenacity and adapted for yarn manufacture, means for supplying such a strip or band from a roll thereof, comprising two positively driven rolls on which the roll of strip or band rests; means for supporting and conveying the strip or band thus supplied to the desired point at a rate substantially that at which the strip or band is supplied; and strand forming means receiving said strip or band from such conveying means and advancing the strand formed from said strip or band at a slower rate than that at which the strip or band is supplied thereto.

13. In apparatus adapted for the manufacture of yarn from paper-like strips or bands of asbestos material bound with sufficient cohesiveness and tenacity and adapted for yarn manufacture, a positively driven moistening roll; an auxiliary roll resting on the moistening roll and beneath which such a strip or band is fed to the moistening roll; a conveying belt receiving said strip or band from the moistening roll; a roll resting in the opening between the moistening roll and the conveying belt to hold the strip or band against the moistening roll; and strand forming means including rub motion belts to which the strip or band is delivered from said conveying belt.

14. In apparatus adapted for the manufacture of yarn from paper-like strips or bands of asbestos material bound with sufficient cohesiveness and tenacity and adapted for yarn manufacture, a positively driven moistening roll; means for determining the point of application of such a strip or band to the moistening roll and the point of delivery therefrom; a generally horizontal conveying belt receiving said strip or band from said moistening roll; rub motion belts receiving said strip or band in a generally horizontal direction from said conveying belt; and means for directing a filament, from a position beneath the conveying belt, beneath the strip or band to the rub motion belts for supporting said strip or band during its entrance into the rub motion belts and during its movement therethrough in the formation of the filament and the strip or band into a strand.

15. In apparatus for yarn manufacture, means for supplying a paper-like strip or band; a moistening roll over which said strip or band passes; a conveyer belt to receive said strip or band from said moistening roll; rub motion belts to receive said strip or band from said conveyer belt and form a strand; means for driving said rub motion belts including means for actuating said belts to advance said strip or band; and connections from said driving means for operating the conveyer belt and moistening roll to advance the strip or band at a somewhat higher speed than the surface speed of the rub motion belts.

16. In apparatus adapted for manufacturing yarn from paper-like strips or bands of asbestos material bound with sufficient cohesiveness and tenacity and adapted for yarn manufacture, means for conveying such a strip or band substantially free from tension; means for forming said strip or band into a strand; and means for forming said strand into a package, comprising two positively driven rolls on which the package rests; and traverse mechanism including a grooved guide roll resting on one of such driven rolls and around the lower part of which the strand passes.

17. In apparatus adapted for the manufacture of yarn from paper-like strips or bands of asbestos material bound with sufficient cohesiveness and tenacity and adapted for yarn manufacture, means for forming such a strip or band and a filament into a strand or yarn; and means including a conveyer belt for applying said strip or band to the filament at the entrance of the strand or yarn forming mechanism.

18. In apparatus adapted for the manufacture of yarn from paper-like strips or bands of asbestos material bound with sufficient cohesiveness and tenacity and adapted for yarn manufacture, means for combining such a strip or band and a filament into a strand or yarn; and means for bringing said strip or band and said filament into juxtaposition at the entrance to such combining means, including a conveyer belt and a positively driven moistening roll delivering the moistened strip or band to the conveyer belt.

19. In apparatus adapted for the manufacture of yarn from paper-like strips or bands of asbestos material bound with sufficient cohesiveness and tenacity and adapted for yarn manufacture, means for combining such a strip or band and a filament into a strand and for advancing the strand; means for tensioning the filament; and means for conveying the strip or band substantially free from tension to said combining means.

20. In apparatus adapted for the manufacture of yarn from paper-like strips or bands of asbestos material bound with sufficient cohesiveness and tenacity and adapted for yarn manufacture, means for combining such a strip or band and a filament into a strand or yarn and advancing the strand or yarn; means for tensioning the filament; and means for moistening the strip or band and conveying the same substantially free from tension to said combining means.

21. In apparatus adapted for the manufacture of yarn from paper-like strips or bands of asbestos material bound with sufficient cohesiveness and tenacity and adapted for yarn manufacture, means for moistening such a strip or band and advancing the same, means for combining such moistened strip or band and a filament into a strand, and means for twisting said strand into a yarn.

22. In apparatus adapted for the manufacture of yarn from paper-like strips or bands of asbestos material bound with sufficient cohesiveness and tenacity and adapted for yarn manufacture, means for supporting and conveying such a strip or band to a desired position, strand forming means receiving said strip or band from said supporting and conveying means, and means for receiving the strand from said strand forming mechanism and for twisting the strand to form a yarn.

23. In apparatus adapted for the manufacture of yarn from asbestos paper-like material bound with sufficient cohesiveness and tenacity and adapted for yarn manufacture, the combination of means for supplying said paper-like material substantially free from tension, and means for associating one or more filaments with said paper-like material to form a strand or yarn.

24. In apparatus for the manufacture of yarn from asbestos paper-like material bound with sufficient cohesiveness and tenacity and adapted for yarn manufacture, comprising means for supplying the said paper-like material, in combination with means for forming said paper-like material into a yarn.

In testimony whereof, I affix my signature.

JOHN ALLEN HEANY.